United States Patent [19]
Brannon et al.

[11] Patent Number: 5,881,813
[45] Date of Patent: Mar. 16, 1999

[54] METHOD FOR IMPROVED STIMULATION TREATMENT

[75] Inventors: Harold D. Brannon, Spring; Robert M. Tjon-Joe-Pin; Brian B Beall, both of Houston, all of Tex.

[73] Assignee: BJ Services Company, Houston, Tex.

[21] Appl. No.: 746,103

[22] Filed: Nov. 6, 1996

[51] Int. Cl.⁶ .................................................. E21B 43/28
[52] U.S. Cl. .......................... 166/304; 166/307; 166/312
[58] Field of Search .................................. 166/304, 307, 166/311, 312

[56] References Cited

U.S. PATENT DOCUMENTS

| | | | |
|---|---|---|---|
| 2,602,778 | 7/1952 | Snyder et al. | 252/8.55 |
| 2,681,704 | 6/1954 | Menaul | 166/22 |
| 2,801,218 | 7/1957 | Menaul | 252/8.55 |
| 3,044,550 | 7/1962 | Eilers | 166/42 |
| 3,684,710 | 8/1972 | Cayle et al. | 252/8.55 R |
| 4,119,546 | 10/1978 | Wernau | 252/8.55 D |
| 4,157,116 | 6/1979 | Coulter | 166/280 |
| 4,160,483 | 7/1979 | Thomas et al. | 166/307 |
| 4,342,866 | 8/1982 | Kang et al. | 536/119 |
| 4,343,363 | 8/1982 | Norton et al. | 166/281 |
| 4,410,625 | 10/1983 | Cadmus | 435/42 |
| 4,479,543 | 10/1984 | Kalfayan et al. | 166/300 |
| 4,502,967 | 3/1985 | Conway | 252/8.55 R |
| 4,514,309 | 4/1985 | Wadhwa | 252/8.55 R |
| 4,609,475 | 9/1986 | Hanlon et al. | 252/8.55 B |
| 4,665,985 | 5/1987 | Berrod et al. | 166/281 |
| 4,690,891 | 9/1987 | Hou et al. | 435/42 |
| 4,713,449 | 12/1987 | Vanderslice et al. | 534/123 |
| 4,809,783 | 3/1989 | Hollenbeck et al. | 166/307 |
| 4,886,746 | 12/1989 | Cadmus et al. | 435/42 |
| 4,928,763 | 5/1990 | Falk | 166/250 |
| 4,996,153 | 2/1991 | Cadmus et al. | 435/209 |
| 5,032,297 | 7/1991 | Williamson et al. | 252/8.551 |
| 5,067,566 | 11/1991 | Dawson | 166/308 |
| 5,103,905 | 4/1992 | Brannon et al. | 166/250 |
| 5,126,051 | 6/1992 | Shell et al. | 210/632 |
| 5,165,477 | 11/1992 | Shell et al. | 166/312 X |
| 5,201,370 | 4/1993 | Tjon-Joe-Pin | 166/300 |
| 5,224,544 | 7/1993 | Tjon-Joe-Pin et al. | 166/295 |
| 5,226,479 | 7/1993 | Gupta et al. | 166/300 |
| 5,247,995 | 9/1993 | Tjon-Joe-Pin et al. | 166/312 |
| 5,421,412 | 6/1995 | Kelly et al. | 166/300 |
| 5,441,109 | 8/1995 | Gupta et al. | 166/300 |
| 5,447,197 | 9/1995 | Rae et al. | 166/293 |
| 5,562,160 | 10/1996 | Brannon et al. | 166/250.1 |
| 5,566,759 | 10/1996 | Tjon-Joe-Pin et al. | 166/300 |

FOREIGN PATENT DOCUMENTS

| | | |
|---|---|---|
| 0030393 B1 | 6/1983 | European Pat. Off. . |
| WO 91/18974 | 12/1991 | WIPO . |
| WO 94/01654 | 1/1994 | WIPO . |

OTHER PUBLICATIONS

Beall et al., "Evaluation of a New Technique for Removing Horizontal Wellbore Damage Attributable to Drill–in Filter Cake," *SPE 3429*, Oct. 6–9, 1996.

Borman, "Bacteria That Flourish Above 100° C Could Benefit Industrial Processing," *C&EN—Science/Technology*, 31–34, Nov. 4, 1991.

Brannon and Tjon-Joe-Pin, "Application of Polymeric Damage Removal Treatment Results in Multi–Fold Well Productivity Improvement: A Case Study," *SPE 29822*, 491–501, Mar. 11–14, 1995.

Brannon and Tjon-Joe-Pin, "Biotechnological Breakthrough Improves Performance of Moderate to High–Temperature Fracturing Applications," *SPE 28513*, 513–530, Sep. 25–28, 1994.

(List continued on next page.)

*Primary Examiner*—William Neuder
*Attorney, Agent, or Firm*—Arnold White & Durkee

[57] ABSTRACT

A method is provided for improving the effectiveness of cleaning up wells in a subterranean formation. The treatment is made more effective by first treating the well with a clean-up fluid that enzymatically degrades residual polymeric viscosifiers followed by removing solids contained in drill-in fluids.

31 Claims, 1 Drawing Sheet

FIRST TWO WELLS TREATED WITH 15% ACID ONLY
LAST WELL TREATED WITH ENZYME FOLLOWED BY 15% HCL ACID

OTHER PUBLICATIONS

Burnett, "Using a Physical Wellbore Model to Study Formation Damage Problems in Well Completions," *SPE 27393*, 495–504, Feb. 7–10, 1994.

Cadmus and Slodki, "Bacterial Degradation of Xanthan Gum," *Industrial Polysaccharides: Genetic Engineering, Structure/Property Relations and Applications edited by M. Yalpani*, 101–107, 1987.

Cadmus and Slodki, "Enzymic Breakage of Xanthan Gum Solution Viscosity in the Presence of Salts," *Developments in Industrial Microbiology*, 26:281–289, Aug. 11–17, 1984.

Hodge et al., "Evaluation and Selection of Drill–in Fluid Candidates to Minimize Formation Damage," *SPE 31082*, 101–115, Feb. 14–15, 1996.

Jeanes, "Applications of Extracellular Microbial Polysaccharide–Polyelectrolytes: Review of Literature, Including Patents," *J. Polymer Sci.: Symposium No. 45*, 209–227, 1974.

Kelly and Brown, "Enzymes From High–Temperature Microorganisms," *Current Opinion in Biotechnology*, 4:188–192, 1993.

LeBlanc, "Limiting, Treating Formation Damage in Horizontal, Extended Reach Wells," *Offshore*, 56–61, Jun. 1996.

McLarty et al., "Overview of Offshore Horizontal Drilling/Completion Projects in Unconsolidated Sandstones in the Gulf of Mexico," *OTC 7352*, 861–868, May 3–6, 1993.

Ryan et al., "Mud Clean–Up in Horizontal Wells: A Major Joint Industry Study," *SPE 30528*, 801–810, Oct. 22–25, 1995.

Slodki and Cadmus, "Production and Stability of Xanthan Gums; Xanthanases and Their Applicability," *Microbes and Oil Recovery vol. 1, International Bioresources Journal*, 190–199, 1985.

Cadmus et al., "High–Temperature, Salt–Tolerant Xanthanase," *Journal of Industrial Microbiology*, 4:127–133, 1993.

Cadmus et al., "Biodegradation of Xanthan Gum by *Bacillus sp.*," *Applied and Environmental Microbiology*, 5–11, 1982.

Ahlgren, "Characterization of Xanthan Gum Degrading Enzymes from a Heat–stable, Salt–tolerant Bacterial Consortium," in *Microbial Enhancement of Oil Recovery: Recent Advances*, edited by Premuzic and Woodhead; published by Elsevier: Amsterdam, pp. 55–63, 1993.

Ahlgren, "Enzymatic Hydrolysis of Xanthan Gum at Elevated Temperatures and Salt Concentrations," in *Gas, Oil and Environmental Biotechnology VI*, edited by Srivastava et al., published by Institute of Gas Technology: Des Plaines, pp. 245–253, 1995.

Ahlgren, "Purification and Characterization of a Pyruvated–Mannose–Specific Xanthan Lyase from Heat–Stable, Salt–Tolerant Bacteria," *Applied and Environmental Microbiology*, 57(9):2523–2528, Sep. 1991.

Ahlgren, "Purification and Properties of a Xanthan Depolymerase from a Heat–Stable Salt–Tolerant Bacterial Consortium," *Journal of Industrial Microbiology*, 12:87–92, 1993.

International Search Report, Feb. 18, 1998.

FIG. 1

METHOD FOR IMPROVED STIMULATION TREATMENT

BACKGROUND OF THE INVENTION

A. Field of the Invention

This invention relates to a method for improving the effectiveness of stimulation treatments in subterranean formations and/or wellbores. In one aspect, the invention relates to methods for improving fluid penetration into the formation by removing residual treating fluids from a wellbore and around the well face.

B. Description of the Prior Art

Acid treatments have been used for many years in new and old wells to dissolve rock, thus enlarging existing channels and to open new ones to the wellbore. Subterranean sandstone or siliceous formations are normally treated with hydrofluoric acid and mixtures of hydrofluoric and hydrochloric acids. Subterranean carbonate formations can be treated with a variety of acid systems, including hydrochloric, acetic and formic acids. For many years acid treatments have been performed after drilling operations in an attempt to remove wellbore damage caused by foreign fluids injected for well drilling and development. Such treatments somewhat improve permeability of the formation around the wellbore, but it is known that the acid will 'wormhole' through the filter cake (and formation in the case of limestone) thereby leaving the bulk of the damaging material in place.

The damaging material is in most cases the result of polymeric viscosifiers which are frequently used in drilling muds and other well completion fluids. Such polymeric viscosifiers remain in the well and tend to interfere with other phases of drilling and/or completion operations, as well as production of the well after such operations are finished. In drilling operations as the wellbore is originally made, fluids tend to seep into the surrounding formation forming a filter cake on the wall of the bore. The filter cake sometimes can prevent casing cement from properly bonding to the wall of the bore.

Moreover, the trajectory of a wellbore is generally tortuous whether it is vertical or horizontal. The wall of the bore often has various ledges and cavities that will collect fluid that has come into contact with it. The fluid in contact with the bore wall tends to gel as water leaks off into the formation, thus greatly decreasing permeability of the formation.

U.S. Pat. Nos. 5,126,051 and 5,165,477 disclose a method for removing one type of fluid, drilling mud, from the wall of a bore and portions of the formation adjacent thereto and for removing residual mud to improve adhesion of casing cement. The patents also disclose a method of cleaning up a well site drilling mud pit. The methods described include adding to the drilling mud an enzyme capable of enzymatically degrading the viscosifier component of the mud. A well treatment fluid comprising one or more enzymes is injected into the well prior to placing the cement between the wall of the bore and casing.

U.S. Pat. No. 5,247,995 discloses a method of degrading damaging material within a subterranean formation of a wellbore using enzymes to improve production from the formation. The enzyme treatment degrades polysaccharide-containing filter cakes and damaging fluids which reduce their viscosity. The degraded filter cake and damaging fluid can then be removed from the formation and produced back to the well surface. This patent discloses the use of particular enzymes which are active at low to moderate temperatures and specific to a particular type of polysaccharide. The enzymes are active in the pH range of about 2.0 to 10.0.

It is known that enzymes may be used to aid in the removal of residual damaging materials from drilling or treating fluids to allow greater flow out of the formation. However, it is many times desirable to improve flow or penetration into the formation, for example, when an acidizing treatment is performed to improve well production, or more specifically, in the case of injection wells. Injection wells are normally used in secondary recovery operations to push oil towards a producing well. If the flow of injected water is restricted by deposits from previous well treatments or by deposit build up over time, such as scale, the effectiveness of the injected water is severely limited. Acid treatments are used many times to improve injectivity, but the restricted permeability of the formation affects the acid penetration in the same way that it affects the injected water. It would be desirable to reduce or eliminate the size of costly acid treatments by improving the effectiveness of a small volume of injected acid.

SUMMARY OF THE INVENTION

It has now surprisingly been found that the effectiveness of stimulation treatments, in particular acid treatments, can be improved by using a water-based clean-up fluid which contains enzyme complexes to degrade viscosifiers thus allowing easy removal of deposits in the wellbore and surrounding formation. With improved clean-up of the wellbore and surrounding formation, greater permeability of the formation can be achieved. The method comprises treating the well with clean-up fluid which comprises an enzyme-containing aqueous fluid; contacting the clean-up fluid with the well bore and formation face for a sufficient time for residual materials to be degraded; and removing solids to improve permeability of the formation. Greater productivity in producing wells and higher injectivity in injection wells is surprisingly obtained by use of the invention described herein. When an acid treatment is used to remove solids, the method further provides the advantages of allowing decreased amounts of acid and lower concentration of acid that would normally be used to obtain increased production.

DETAILED DESCRIPTION OF THE INVENTION

Frequently the production of hydrocarbons from wells is less than desirable due to the low permeability of the strata which results in poor conductivity to the wellbore. Decreased permeability may be due to formation damage caused by drilling or treating fluids, by deposit build-up, and other factors. It is common practice to attempt to improve production after drilling by stimulating the well or by other secondary operations.

In the most successful and most widely used of these secondary operations, a fluid is injected into the formation by pumping it through one or more injection wells drilled into the formation, oil is displaced within and is moved through the formation, and is produced from one or more production wells drilled into the formation. In a particular recovery operation of this sort, field water or field brine is usually employed as the injection fluid and the operation is referred to as a waterflood. The injection water is often referred to as flooding liquid or flooding water as distinguished from the in situ formation, or connate water. Fluids injected later can be referred to as driving fluids. Although water is the most common, injection and drive fluids can include gaseous fluids such as steam, carbon dioxide, and the like.

It has long been recognized that the chemistry of various waters encountered in oil field operations is such that low solubility compounds are present. Under certain conditions, these sparingly soluble salts may precipitate out and lead to the formation of deposits. Acid treatment of formations may improve the conductivity by injecting an acid solution into the wellbore and into the production strata. Hydrochloric acid in concentrations ranging from about three percent to about twenty eight percent is normally used in this type of treatment. However, drilling fluids containing viscosifying agents and/or other well treatment fluids containing viscosifying agents frequently inhibit the penetration of aqueous acid fluids at the formation face.

The production capability or injection efficiency can decrease drastically in open hole, horizontal, extended reach, multilateral, and high-angle wells. These types of wells present difficult problems related to cuttings suspension and removal and, by their nature are more susceptible to formation damage. Such wells are designed to increase production by increasing surface area within the producing zone. To achieve the intended increased production through increased surface area, damage to formation permeability in the area of interest must be minimized. A special type of drilling fluid, "drill-in" fluids, have been found to be highly useful in such wells. Drill-in fluids (which are also referred to as "clean" fluids) containing low-residue producing polymers are normally preferred so that potential permeability damage is reduced. Properly utilized, drill-in fluids improve well productivity as measured by higher-than-expected production rates and improved reservoir recovery. Drill-in fluids have become very popular in the drilling of horizontal and multilateral wells due to their ability to suspend and remove cuttings.

The categories of drill-in fluids include sized salt, specially sized calcium carbonate, conventional calcium carbonate, mixed-metal hydroxide, and specially formulated oil-based and synthetic fluids. Selection of the appropriate type of drill-in fluid depends upon matching the drill-in fluid with the reservoir and completion design. Important reservoir characteristics to consider in selecting a drill-in fluid include permeability (for example vertical fracture or matrix), grain size distribution, pore size, mineralogy, connate water, crude and gas composition and properties, and reservoir pressure and stress conditions.

Drill-in fluids normally contain viscosifying polymers such as a biopolymer, biopolymer blends, derivatized starch, or derivatived cellulose. Drill-in fluids can consist of different combinations of viscosifiers. Examples of such systems include but are not limited to starch-based systems containing xanthan, cellulose-based systems containing xanthan, and mixed systems containing cellulose, xanthan and starch. Water based drill-in fluids such as sized salt fluids may contain 3 to 5 pounds of biopolymer per barrel, derivatized starch, and an additional derivatized starch to act as a filtration control agent. When such water-based fluids are used acid-based or oxidizer-type breaker systems have been incorporated to break down the residual mud and filter cake. Acid based breaker systems (typically 5 to 15% by weight hydrochloric acid) and oxiding breakers would not include enzymes. Filter cakes are formed, however, even when "clean" drill-in fluids are introduced into subterranean formations with conventional breaker systems. The method of the present invention is effective to degrade the various types of polymer systems which are conventionally used in drill-in fluids.

Filter cakes which are inevitably formed by drill-in fluid systems can still dramatically decrease the flow efficiency of uncased or open hole well completions. Materials such as calcium carbonate or salt are frequently used as weighting additives in these fluids to maintain the pressure required to keep the well under control and to provide fluid loss control materials to prevent leakoff. Such solid components become consolidated and trapped in the polymeric material thereby making the filter cake a strong permeability barrier, even though the polymer itself may not produce residue upon degradation. In order to regain maximum permeability of the formation around the wellbore it has been found that of the polymeric material which surrounds solid components is degraded, then the solids can be more easily removed.

In general, the method of the present invention comprises first introducing a clean-up fluid into a subterranean formation by way of a wellbore. The clean-up fluid is an aqueous-based fluid that includes an enzyme or combination of enzymes which are effective to degrade polymeric viscosifiers that have been injected into the wellbore. The clean-up fluid is prepared by admixing a quantity of the enzyme(s) sufficient to degrade polymeric viscosifiers with an aqueous liquid as the carrier fluid. The aqueous liquid may be fresh water, sea water, or brine and may include additives such as buffering agents to control pH, clay stabilizers, surfactants, or other agents. The enzyme or enzymes selected for the clean-up fluid depend upon the type of polymeric viscosifiers believed to be in the well. A single enzyme or a combination of enzymes may be used.

The clean-up fluid may also be in the form of a foam of at least about 50% quality. Clean-up fluid in such form is desirable to prevent loss of the fluid before contact with the entire wellbore is achieved. Such instances may be especially encountered in open holes or where fractures in the wellbore are to be treated. However, in certain circumstances, for example injection wells, it may not be desirable to clean up natural fractures.

In accordance with the present invention, the enzyme or combination of enzymes selected are highly specific to the chemical structure of the polymer viscosifiers. Polymeric viscosifiers which may be found in wellbores include, but are not limited to, cellulose and derivatives thereof; biopolymers such as xanthan and biopolymer blends; starch and derivatives thereof; and guars and derivatives thereof. For cellulose-type polymers used in the drilling or completing fluids, suitable enzymes include those that attack glucosidic linkages of the backbone for example cellulases, hemicellulases, glucosidases, endoxylanases, exoxylanases and the like. The preferred enzymes for cellulose-type polymers include cellulases and xylanases. The most preferred are the cellulase enzymes that specifically hydrolyze the exo $(1,4)$-$\beta$-D glucosidic and the endo $(1,4)$-$\beta$-D-glucosidic linkages of the cellulose polymer backbone.

When starch is a component of the drilling or completion fluid, suitable enzymes include those that attack the glucosidic linkages of the amylose and amylopectin polymers, which include enzymes and combinations of enzymes selected from amylases, glucosidases and the like. The preferred enzymes for starch include endoamylases, exoamylases, isoamaylases, glucosidases, glucan $(1,4)$-D-glucosidases, glucan $(1,6)$-$\alpha$-glucosidase, oligo-$(1,6)$-glucosidase, d-glucosidase, $\alpha$-dextrin endo-$(1,6)$-D glucosidase, amylo-$(1,6)$-$\alpha$-glucosidase, glucan $(1,4)$-D-maltotetrahydralase, glucan $(1,6)$-$\alpha$-D maltosidase, glucan $(1,4)$-$\alpha$-maltohexosidase. The most preferred enzyme for starches is $(1,4)$-$\alpha$-D-glucosidase.

When xanthan is a component of the drilling or completion fluid, enzymes suitable for cellulose may be used;

however, because xanthan is a heteropolysaccharide with a cellulose backbone having trisaccharide side chain linkages, it is preferred that at least two enzymes be used in the clean-up fluid to degrade xanthan. The preferred enzymes in that case include those listed for cellulose-type polymers together with a mannosidase or mannan (1,2)-β-D-mannosidase, in particular the preferred combination is (1,2)-β- and/or (1,4)-β-D-mannosidase, (1,4)-β-D-cellulase, and (1,4)-ϕ-D-glucanohydrolase. When guar-type viscosifiers (galactomannans) are found in the drilling or completion fluid, suitable enzymes include those that attack and hydrolyze the (1,6)-α-D-galactomannosidic and (1,4)-β-D mannosidic linkages. In that case, the most preferred enzymes are galactomannases, in particular, (1,4)-β-D mannosidase and (1,6)-α-D-galactosidase.

The activity of most enzymes is dependent upon the pH of the aqueous liquid environment. In the method of the present invention, the pH of the aqueous liquid should be adjusted to accommodate the particular enzyme or combination of enzymes being used. In general, the enzymes of the invention are stable in the pH range of 2 to 11 and remain active at both acid and alkaline ranges. The enzymes must also be active over a temperature range of about 10° C. (50° F.) to about 150° C. (327° F.). The preferred pH range is about 3 to about 7 at temperatures of about 26° C. (80° F.) to about 150° C. (327° F.). At temperatures above about 50° C. (122° F.), the preferable pH range is about 3 to 5.

The concentration of enzyme in the clean-up fluid should be an amount effective to degrade the polymeric viscosifiers found in the wellbore. In general, the concentration is dependent upon the type of viscosifier used in the drilling or completion fluid, the temperature of the formation, the pH of the fluid, among other factors. In general, an effective amount of enzyme will be admixed with the aqueous carrier fluid which is in the range of from about 0.1 to about 250 gallons per thousand of carrier fluid The amount is preferably in the range of 10 to 100 and varies depending upon the particular enzyme which is suitable for the drill-in fluid. It may be necessary to adjust the amount to higher or lower concentrations depending on well conditions. It is within the skill in the art to optimize the amount of enzyme necessary to effectively degrade the polymeric viscosifier within a desired time period. In the present invention, preferably the clean-up fluid has effectively degrade the viscosifier within seven days, and more preferably within four to twenty four hours.

In a preferred embodiment, the clean-up fluid is prepared by admixing (1,4)-α-D-glucan glucano-hydrolase with an aqueous liquid at about 10 gallons of concentrate per 1000 gallons of aqueous liquid. In another preferred embodiment the clean-up fluid of the present invention is prepared by admixing exo-(1,4)-β-glucosidase and endo (1,4)-β-glucosidase in a ratio of 1 to 4 (weight/weight) solution with an aqueous liquid at about 20 gallons per 1000 gallons of aqueous liquid.

In the method of the present invention, after preparing a clean-up fluid suitable for degrading the residual polymeric viscosifiers of a particular well, the clean-up fluid is injected into the well using suitable equipment. It may be spotted in a wellbore having an open hole through drill pipe or injected using coiled tubing. In the method of the present invention, an appropriate volume of clean-up fluid is to be injected into the well which volume is determined by the size of the wellbore plus accounting for some fluid loss due to leakoff. For example for an open hole, the volume of the open hole plus an additional volume of about 25% is believed to be an optimal amount required for filling the drilled hole and allowing for fluid leakoff of about 25%. It is also preferred when using coiled tubing that initially the tubing extend through the entire producing interval of interest.

Once the clean-up fluid is in place, the well is shut in to allow the clean-up fluid to degrade residual polymeric viscosifiers in the wall of the bore and the surrounding formation. The time for shut-in will vary from well to well depending on temperature, fluid treatment composition and concentrations, and reservoir conditions. Generally, the shut-in time should be in the range of about 0.1 to about 24 hours. The preferred time for shut-in of the clean-up fluid is about 1 to about 8 hours. In any case, the shut-in time should be long enough to allow total placement of the clean-up fluid in the wellbore and permit contact of the clean-up fluid to the exposed surface areas of the wellbore and any extensions thereof. After sufficient time has elapsed for the clean-up fluid to act, the clean-up fluid in certain applications may be recovered from the wellbore and formation if desired.

In the next step of the method an acid treatment is normally performed. The parameters for the acid treatment are designed for the particular well of interest and depend upon whether the formation is sandstone or carbonate in nature. The selection of the specific treatment parameters for the acid can be readily determined by one skilled in the art. In general, the acid treatment will include selection of an aqueous acid that may include additives such as corrosion inhibitors, surfactants, retarders, friction reducers, anti-sludge agents, and the like. Aqueous acids include hydrochloric, hydrofluoric, and mixtures thereof, and other types of acids suitable for the particular well to be treated. Hydrochloric acid in a concentration of about three to twenty-eight percent is preferably used in the method of the present invention, however, mixtures of hydrochloric acid with other acids may also be used. An appropriate amount of the aqueous acid is injected into the wellbore so that the portion of the well previously treated with the clean-up fluid is contacted with the acid. In a preferred embodiment the acid is injected in the wellbore using coiled tubing.

Alternatively, when the drill-in fluid used in the well contains sized salt instead of sized calcium carbonate as the weighting additive, it may be desirable to use an undersaturated brine after the clean-up fluid. The undersaturated brine will act to remove the sized salt so that permeability at the formation face may be increased.

The method of the present invention in which the injection of clean-up fluid precedes an acid treatment provides improved production and thereby improved cost effectiveness. For example, a drill-in fluid containing a biopolymer such as xanthan; derivatized starch for filtration control; calcium carbonate; and salts (bridging salts) in brine. While the well is being drilled, the drill-in fluid will contact the formation and the aqueous portion will leak off into the formation leaving on the formation face a filter cake of salts, calcium carbonate, biopolymer and starch. A clean-up fluid containing a combination of enzymes to degrade the starch (for example an endoamylase) and the biopolymer (for example mannosidase and cellulase) in an aqueous carrier fluid is injected into the wellbore and the well is shut-in. The clean-up fluid degrades the polymer so that solids contained in the filter cake can be removed. After the appropriate amount of time has passed, a treatment is performed to remove the solids. It has surprisingly been discovered that by utilizing the present invention for injection wells the size of the acid treatment and concentration of the acid can be substantially reduced while obtaining the same or greater increase in production. The clean-up fluid allows greater and more uniform penetration of the acid into the formation.

While the method of the present invention is useful for many applications, it is especially advantageous for injection wells. As set forth below, unexpected and surprising results were obtained by practicing the method described herein. It was known that an acid treatment alone may improve the injectivity of injection well and that alone degradation of residual polymeric viscosifiers left by drilling or treating fluids may increase flow from a well. By using the method of the invention, it was unexpectedly found that zones in the formation that normally do not take injection fluid received fluid, fractures that normally take most of the fluid were not opened so a better sweep efficiency was achieved, and thus potential for improved reservoir recovery was obtained.

The following examples are intended to illustrate the method of the present invention but do not limit the invention in any way:

EXAMPLE I

The method of the present invention was tested in offshore injection wells of a depth of about 12,000 feet. The offshore injection wells had a horizontal 6.125 inch open hole. The wells had been drilled using "clean" drill-in fluids which contained a cellulose polymer and calcium carbonate. The control well was completed using only hydrochloric acid. The control well had an interval of 4,070 feet to be treated with a bottom hole temperature of about 93° C. (200° F.). The control acid treatment comprised 40 gallons per foot of 15% hydrochloric acid and additional additives including a corrosion inhibitor, anti-sludge agent, friction reducer, and iron control agent. The treating parameters for the control well were 40 gallons per foot, 2.6 barrels per minute pump rate, 2.6 feet per minute of tubing moment at 4,500 psi, using a rotary wash tool to place the acid. The total volume of acid pumped was 135,000 gallons. At the conclusion of the acid treatment, the equipment was removed. It was determined that an injection rate of 13,000 barrels of water per day (BWPD) could be accomplished. Production logs showed that there was no flow or injection below about 10,900 feet. From that, it was determined that 1,300 feet or about 32% of the open hole was not taking water from the injection and that 39% of the 135,000 gallons of acid was pumped to no effect on its intended target.

The test well for the method of the present invention had a measured depth of about 12,700 feet with an interval of 4,080 feet and a bottom hole temperature of about 99° C. (211° F.). The method of the present invention comprised forming a clean-up fluid with a pH in the range of 4 to 7 comprising 2% by weight potassium chloride to which a cellulase enzyme was added at 60 gallons per thousand gallons of KCl solution and a fluorosurfactant ("Inflo") at 5 gallons per thousand gallons was added. The enzyme was a mixture consisting of exo-(1,4)-$\beta$-D-cellulase and endo-(1, 4)-$\beta$-D-cellulase in a 1:4 (weight/weight) solution.

It was calculated that 149 barrels would be needed to fill the open hole. Two hundred (200) barrels of the clean-up fluid was made and pumped at 1–1.5 barrels per minute through 2-inch coiled tubing. The coiled tubing ended short of the bottom of the interval by about 171 feet. After injecting the clean-up fluid, the well was shut-in for about 12 hours. The well was opened and began taking about 3,361 barrels of water per day. Next the acid treatment was performed in which 112,800 gallons of 15% hydrochloric acid (40 gallons per foot) were pumped into the well. After the well was opened again, the well began taking over 20,000 barrels of water per day and continued improving over the following days. The production log showed that the entire interval was accepting water. Surprising improvement in the injectivity of the well treated by the method of the present invention was obtained. The injectivity was increased on the order of about 50–54% with an accompanying improvement in the injection profile. The production logs unexpectedly showed even injectivity along the entire open hole section that was treated by the method described herein.

EXAMPLE II

The method of the present invention was tested in offshore injection wells in the Arab C reservoir. Two control wells were drilled into the formation. The first control well (Well #1) was an 8.5 inch open hole well. The second control well (Well #2) was completed with a 7 inch slotted liner. The well treated in accordance with a method of the present invention (Well #3) also was completed with a 7 inch slotted liner. All three wells were on the same tower. Well #1 and Well #2 were drilled first, however, completion was suspended until Well #3 was drilled. The control wells were suspended for twelve weeks and six weeks respectively. The initial injectivity information concerning the wells is set forth in Table I below.

TABLE I

| WELL NO. | COMPLETION TYPE | WEEKS BEFORE COMP. | AVG. PERM. (MD) | INITIAL INJECTION (BWPD) | INITIAL INJECTIVITY | FINAL INJECTION (BWPD) | KH (MD/FT) |
|---|---|---|---|---|---|---|---|
| 1 | 8.5" open hole | 12 weeks | 0.74 | 576 | 2.3 bpm @ 2300 psi (0.7 psi/ft) 50 bbl pumped | 4765 | 932 |
| 2 | 7" slotted liner | 6 weeks | 1.1 | 288 | 3 bpm @ 2300 psi (0.7 psi/ft) 90 bbl pumped | 4766 | 1265 |
| 3 | 7" slotted liner | — | 0.5 | 288 | 0.2 bpm @ 1900 psi over 1.13 SG Brine (0.7 psi/ft) 10 bbl pumped | 3024 | 488 |

Each well treated with 15% hydrochloric acid in the manner described in Table II below. The foamed gel was used in Well #2 and Well #3 to act as a diverter and was prepared using guar at 20 pounds per thousand gallons.

TABLE II

| WELL NO. | TOTAL ACID VOL. | ACID VOL. (g/ft) | ACID TYPE | FORM OF INJECTION |
|---|---|---|---|---|
| 1 | 33,012 | 26 | 15% HCl + foam in stages 786 bbl | Bullheaded |
| 2 | 23,058 | 20 | 100 ft stages 15% HCl 357 bbl acid 328 bbl foamed gel | Coiled Tubing |
| 3 | 23,982 | 26 | 100 ft stages 15% HCl 517 bbl acid 557 bbl foamed gel | Coiled Tubing |

Well #3 was completed in accordance with the method of the present invention. Prior to acidizing, the well was treated with 4200 hundred gallons of clean-up fluid. The clean-up fluid comprised filtered sea water (1.03 specific gravity, 8.6 ppg) to which 20 gallons per thousand of the enzyme mixture and 5 gallons per thousand of surfactant of Example I were added. The clean-up fluid was allowed to soak in the well for 12 hours, then the well was back flowed. It produced 8 barrels per hour returning 1.06–1.12 SG seawater. After back flowing, the injectivity was rechecked prior to acidizing. After the enzyme soak, sea water was injected at 0.6 barrels per minute at 1500 psi (110 barrels pumped).

Well #1, a control well, had been shut-in for an extended period of time (12 weeks) and was treated by bull heading the acid because coiled tubing could not be run to the bottom. As set forth in FIG. 1, the final normalized injectivity was relatively low which would be expected due to poor acid distribution. See Table III below. The well appears, however, to perform acceptably using standard permeability analysis. Given the method of application of the acid and the resulting poor distribution, area specific stimulation is believed to have occurred. Based on the data the observed injectivity increase is likely due to a short zone receiving the majority of the acid treatment due to extensive worm-holing in a specific area of the wellbore. This is a common observation when bull heading acid into horizontal wells. Once worm-holing through the filter cake occurs, the rest of the acid flows into the same area, thus enlarging the worm holes and increasing the flow to the same area. Even with the use of foam diverting stages, limited distribution of acid is typically encountered with this method of application.

Well #2, the second control well, was treated after a period of shut-in for six weeks by pumping acid through coiled tubing so that better distribution of acid along the wellbore could be obtained. Well #2 showed significant improvement in initial injectivity (taken prior to extended shut-in), and injectivity after acidizing based on normalized injectivity. See Table III. However, the injectivity relative to available permeability was poor and may be indicative of relatively poor efficiency of the acid in cleaning up damaging polymer filter cake and solids. It is known in the art that polymer-coated carbonate particles used for weighting and fluid loss control are resistant to acid attack and can prevent filter cake dissolution by acid.

TABLE III

| WELL NO. | INITIAL INJECTIVITY BWPD/psi | FINAL INJECTIVITY BWPD/psi | NORMALIZED INJECTIVITY |
|---|---|---|---|
| 1 | 1.44 [2.3 bpm @ 2300 psi (.07 psi/ft) 50 bbl pumped] | 3.18 (4765 BWPD/1500 psi) | 2.21 |
| 2 | 1.88 [3 bpm @ 2300 psi (0.7 psi/ft) 90 bbl pumped] | 3.18 (4766 BWPD/1500 psi) | 1.69 |
| 3 | Before clean-up: .15 [0.2 bpm @ 1900 psi over 1.13 SG Brine (0.7 psi/ft) 10 bbl pumped] After clean-up: .58 (.6 BWPD/1500 psi) | 2.02 (3024 BWPD/1500 psi) | 13.44 |

Figure 1:
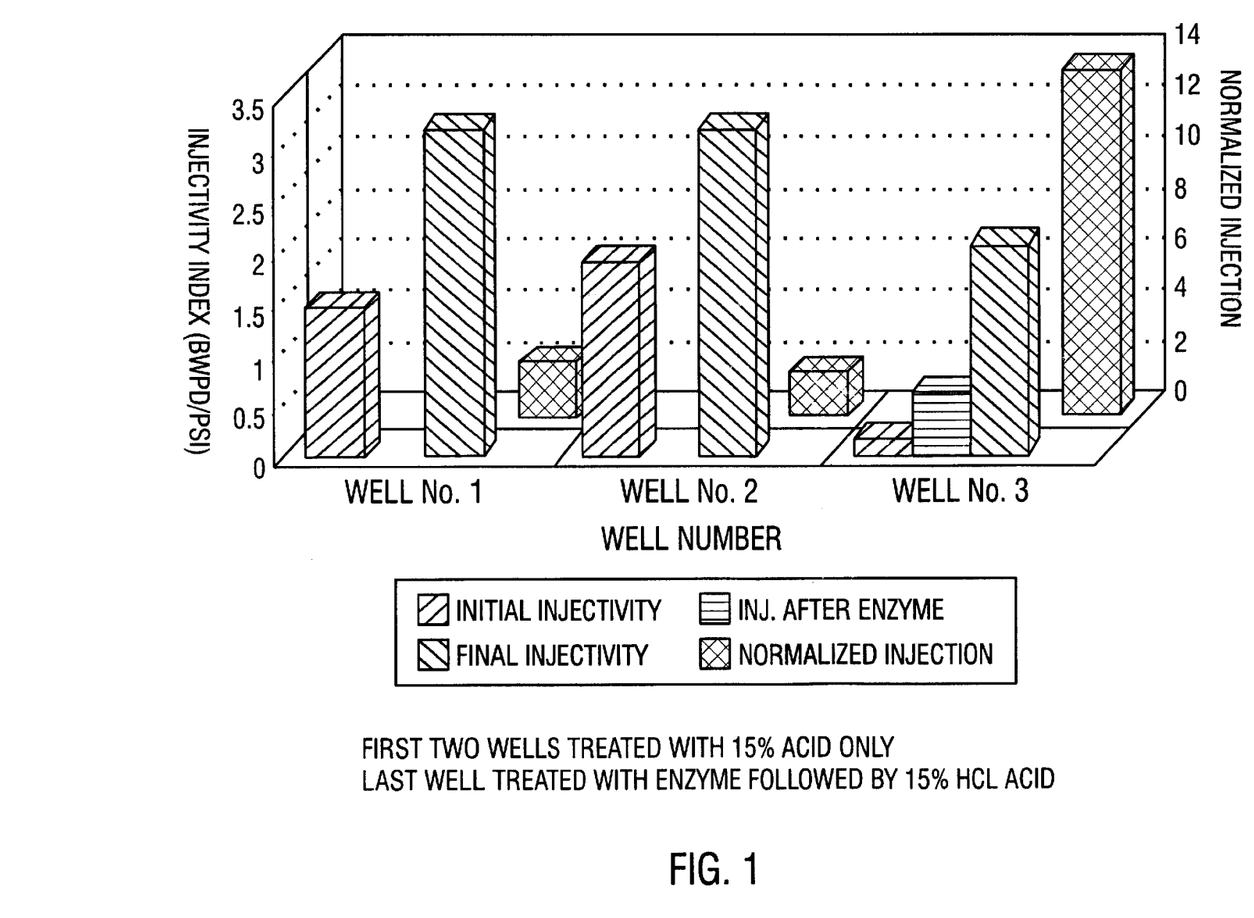

Poor acid efficiency for Well #2 is shown in FIG. 1, in which normalized injectivity of improvement of only 0.54 between injectivity just prior to acidizing and after acidizing provided only an additional 0.25 barrels of injection per millidarcie foot of available permeability. This result could be indicative of some partial natural degradation of polymer filter cake during the extended shut-in period, while leaving polymer-coated carbonate particles that are less susceptible to acid attack. Additionally, the ability of acid to worm hole through the polymer filter cake, without removing the cake could be responsible for the low injectivity with respect to permeability, as the filter cake can remain in place along the length of the wellbore.

Well #3 was treated in accordance with the present invention to improve the acid treatment. As shown in Table III, an excellent result was obtained indicating that the treatment had removed the polymer and the solids. Efficiency of the acid treatment was clearly improved by the use of the clean-up fluid. The clean-up fluid provided an initial injection prior to acidizing (with only a 12 hour shut-in) equivalent to that of Well #1, with a normalized injection ratio of 13.44. Following the acid treatment, the injection was improved further and is by far the most efficient acid treatment of the three wells in the well having the lowest permeability. These values indicate that the total well clean-up was more efficient at removing polymer and solids damage along the wellbore, with the likelihood that better distribution of acid was achieved with associated sweep efficiency. These results are consistent with information known about horizontal wells in which a higher permeability formation will show a relatively smaller damage than a low permeability formation. The method of the present invention has provided a means, in a significantly tighter zone, to provide improved injectivity.

Standard equations to determine injectivity indices have also been applied to the three wells discussed above. While such equations are a reasonable tool to examine the relative increases in injectivity of a given well, they are not suitable for comparing wells as the equation does not take into account the difference between the wells, that is, available permeability for injection. When the standard injectivity indexes are calculated, Well #2 could be considered an acceptable treatment, provided that fluid distribution is not taken into account with respect to sweep efficiency in the reservoir. It is expected that for Well #2, and for Well #1, that partial natural degradation of the polymer filter cake probably occurred during the shut-in period, while leaving some coated solids. Under most circumstances, wells will not be shut-in for such extended periods of time and the results for Well #1 and Well #2 are better than would be expected had they been completed right after drilling. Production logs were not available and the extent of injection along the wellbore was not available for these wells. The injectivity comparison for these wells is set forth in FIG. 1. The well treated in accordance with the method of the present invention shows the greatest increase in normalized injection.

EXAMPLE III

Laboratory core tests were conducted in order to evaluate the method of the present invention. The tests were conducted in accordance with the API conductivity cell test. A 100 millidarcie Berea slab was mounted on one side of the cell and a clear slab and piston mounted to the other side of the cell for observation. An initial permeability measurement with 2% KCl brine was made. A carbonate mud system was squeezed against the inner diameter of the Berea core at 250 psi for thirty minutes. The carbonate mud used for the experiments comprised water at 100 milliliters, 3.96 grams of xanthan polymer, 8.04 grams of starch, 60 grams of ground calcium carbonate, and 0.96 grams flake sodium hydroxide. Following the mud squeeze, the return permeability of the cylinder was measured with 2% KCl. The clean-up fluid was then flushed through the core for thirty minutes. The clean-up fluid comprised an enzyme for starch-containing fluids, (1,4)-α-D-glucosidase. The cell was shut-in for sixteen hours at 120° F. A return permeability measurement was made. A 5% solution of HCl was then washed through the core for 30 minutes and then allowed to soak for thirty minutes. The permeability retention measurement following the acid wash was made. One pore volume of acid was injected into the core and the acid was displaced with one pore volume of brine. A final permeability measurement was made.

The initial permeability of the slab was measured at 88.8 millidarcies. Following the thirty minute mud squeeze, the permeability was reduced to 47.7 millidarcies or by 46.3%. The clean-up solution was then introduced and flowed across the slab for thirty minutes. Following the shut-in, the permeability improved to 58.2 millidarcies or a 65.5% retention. A visual examination of the slab following the enzyme soak and permeability measurement showed that carbonate particles still appeared to still coat the slab that some irregularities and textures were visible after the acid wash, the final permeability retention measurement showed that it was restored to 97.3%. Upon visual inspection only a small amount of residue carbonate mud was found.

EXAMPLE IV

Additional tests were run in radial test cells to stimulate a well bore configuration using a sequence similar to that described for Example III. Tests were done using 5% and 15% HCl only as controls for comparing the methods described herein. The procedure generally involved the determining the initial permeability with 2% KCl followed by squeezing the mud of Example III for 30 minutes at 250 psi. The initial return permeability after the mud squeeze was determined. For the control, HCL was flowed for 30 minutes and allowed to soak for an additional 30 minutes. Return permeability was determined. One pore volume of acid was injected and return permeability was determined again. For the methods of this invention, clean-up fluid was injected after the mud squeeze and allowed to flow for 30 minutes. One pore volume of the clean-up fluid was then injected and the core was shut-in for 16 hours at 200° F. (93° C.).

The results are set forth in Table IV below.

TABLE IV

| * | | 5% HCl | | 15% HCl | |
|---|---|---|---|---|---|
| | | Acid Only | Enzyme/Acid | Acid Only | Enzyme/Acid |
| * | Initial Return Permeability | 21% | 39% | 32% | 42% |
| * | After Enzyme | | 75% | — | 86% |
| * | After Acid | 27% | 60% | 60% | 103% |

The methods of the present invention showed vastly improved return permeability as compared to the controls.

What is claimed is:

1. A method for improving the effectiveness of a well treatment in subterranean formations comprising the steps of:
   injecting a clean-up fluid into the well wherein the clean-up fluid contains one or more enzymes in an amount sufficient to degrade polymeric viscosifiers;
   contacting the wellbore and formation with the clean-up fluid for a period of time sufficient to degrade polymeric viscosifiers therein;
   performing a treatment to remove non-polymer solids that may be present; and
   removing the non-polymer solids in the well to improve productivity or injectivity of the subterranean formation.

2. The method of claim 1, wherein the clean-up fluid is an aqueous liquid containing one or more enzymes suitable to degrade polymeric viscosifiers selected from the group consisting of cellulose polymers and derivatives thereof, starch and derivatives thereof; biopolymers; guar and derivatives thereof; xanthan, carrageenans and derivatives thereof.

3. The method of claim 1, wherein the polymeric viscosifiers comprise at least one of starch, derivatized starch, derivatized cellulose, xanthan, or a mixture thereof.

4. The method of claim 1 wherein the enzymes are selected from the group consisting of cellulases, xylanases, endoamylases, mannosidases, and galactomannanases.

5. The method of claim 1 wherein the treatment to remove non-polymer solids comprises injecting an acid into the well.

6. The method of claim 1 wherein the treatment to remove non-polymer solids comprises injecting an undersaturated brine into the well.

7. The method of claim 1, wherein the non-polymer solids are caused by drilling fluids, treating fluids or deposit buildup.

8. The method of claim 7, wherein the deposits are formed by precipitation of low solubility compounds from water.

9. The method of claim 7, wherein the source of the non-polymer solids comprise material present in a drill-in fluid system.

10. The method of claim 1, wherein the non-polymer solids comprise salt or acid soluble material.

11. The method of claim 10, wherein the acid soluble material comprises calcium carbonate.

12. The method of claim 1, wherein the source of the polymeric viscosifiers is drilling mud or well completion fluid.

13. The method of claim 12, wherein the source of the polymeric viscosifiers is drilling mud.

14. The method of claim 12, wherein the source of the polymeric viscosifiers is drill-in fluid.

15. The method of claim 1, wherein said clean-up fluid is injected prior to performance of said treatment to remove non-polymer solids.

16. A method for improving the injectivity in subterranean formations comprising the steps of:
    injecting a clean-up fluid into the wellbore wherein the clean-up fluid contains one or more enzymes in an amount sufficient to degrade filter cakes produced by polymeric viscosifiers;
    shutting-in the well; and
    then performing a treatment to remove solids that may be present from fluids used to drill the well, wherein said treatment to remove solids comprises acid or undersaturated brine.

17. The method of claim 16 wherein the enzymes are selected from the group comprising cellulase, xylanases, amylases, glucosidases, mannosidases; and galactomannases.

18. The method of claim 16 wherein the enzyme of the clean-up fluid comprises mixtures of enzymes and a surfactant.

19. The method of claim 16 wherein the treatment to remove solids is an acid treatment in which the acid is selected from the group consisting of hydrochloric acid, hydrofluoric acid, acetic acid, formic acid, and mixtures thereof.

20. A method for improving the effectiveness of a well treatment in subterranean formations comprising the steps of:
    preparing a clean-up fluid comprising a liquid and one or more enzymes selected to degrade polymeric viscosifiers that may be present from fluids used to drill the well;
    injecting the clean-up fluid into the well;
    shutting-in the well for a period of time sufficient to degrade the polymeric viscosifiers; and
    then performing a treatment to remove solids that may be present from fluids used to drill the well, wherein said treatment to remove solids comprises acid or undersaturated brine.

21. The method of claim 20, wherein the clean-up fluid is a liquid containing one or more enzymes suitable to degrade polymeric viscosifiers selected from the group consisting of cellulose polymers and derivatives thereof; starch and derivatives thereof; biopolymers; xanthan, guar and derivatives thereof.

22. The method of claim 20, wherein the polymeric viscosifiers comprise at least one of starch, derivatized starch, derivatized cellulose, xanthan, or a mixture thereof.

23. The method of claim 20 wherein the enzymes are selected from the group consisting of cellulases, xylanases, endoamylases, mannanases, and galactomannases.

24. A method for improving the effectiveness of a well treatment in subterranean formations comprising the steps of:
    injecting a clean-up fluid into the well wherein the clean-up fluid contains one or more enzymes in an amount sufficient to degrade polymeric viscosifiers;
    contacting the wellbore and formation with the clean-up fluid for a period of time sufficient to degrade polymeric viscosifiers therein; and
    injecting an acid into the well to remove solids and improve productivity or injectivity of the subterranean formation.

25. A method for improving the effectiveness of a well treatment in subterranean formations comprising the steps of:
    injecting a clean-up fluid into the well wherein the clean-up fluid contains one or more enzymes in an amount sufficient to degrade polymeric viscosifiers;
    contacting the wellbore and formation with the clean-up fluid for a period of time sufficient to degrade polymeric viscosifiers therein; and
    injecting an undersaturated brine into the well to remove solids and improve productivity or injectivity of the subterranean formation.

26. A method for treating a subterranean formation in which solids coated or surrounded with polymeric viscosifier may be present, comprising the steps of:
    injecting a clean-up fluid into a well penetrating a subterranean formation, said clean up fluid comprising one or more enzymes; and
    performing a stimulation treatment;
    wherein said solids coated or surrounded with polymeric viscosifier are resistant to removal by said stimulation treatment, wherein said clean-up fluid is effective to degrade said polymeric viscosifier, and wherein said stimulation treatment is effective to remove said solids.

27. The method of claim 26, wherein said clean-up fluid is injected prior to performance of said stimulation treatment.

28. The method of claim 27, wherein said stimulation treatment comprises injecting an undersaturated brine into said well.

29. The method of claim 28 wherein the enzymes are selected from the group comprising cellulase, xylanases, amylases, glucosidases, mannosidases; and galactomannases.

30. The method of claim 27, wherein said stimulation treatment comprises injecting an acid into said well.

31. The method of claim 30, wherein said acid is selected from the group consisting of hydrochloric acid, hydrofluoric acid, acetic acid, formic acid, and mixtures thereof.

* * * * *

UNITED STATES PATENT AND TRADEMARK OFFICE
CERTIFICATE OF CORRECTION

PATENT NO. : 5,881,813

DATED : March 16, 1999

INVENTOR(S) : Brannon et al.

It is certified that error appears in the above-identified patent and that said Letters Patent is hereby corrected as shown below:

On the title page, item [75], line 2, after 'Brian B' insert -- . --.

In claim 29, column 14, line 51, delete "28", and insert the following therefor: -- 27 --.

Signed and Sealed this

Tenth Day of August, 1999

Attest:

Q. TODD DICKINSON

Attesting Officer

Acting Commissioner of Patents and Trademarks